Oct. 7, 1969  W. L. MACKIE  3,470,787
CORROSION PREVENTION DEVICE AND METHOD
Filed March 27, 1968
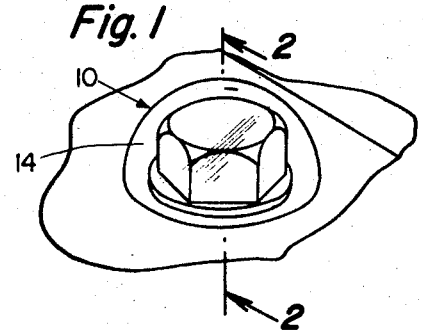
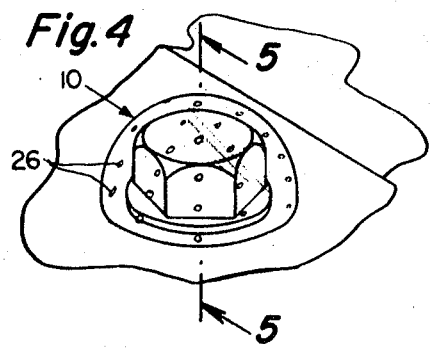
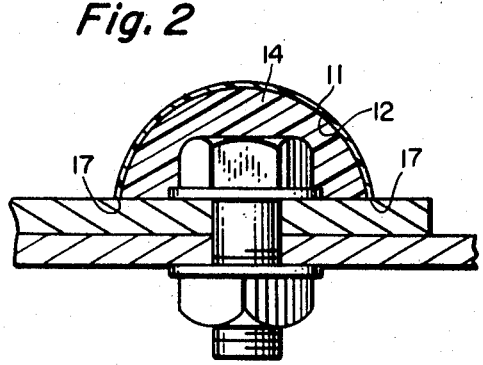
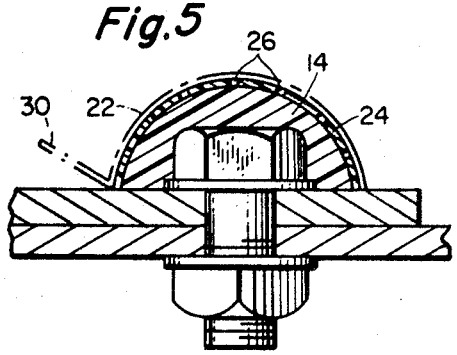
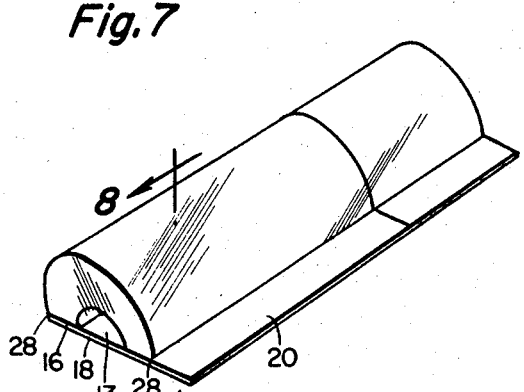
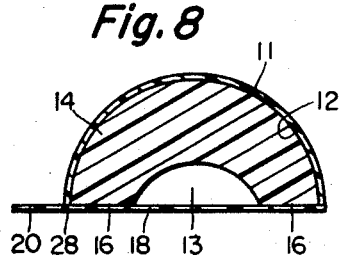
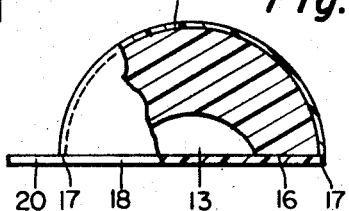
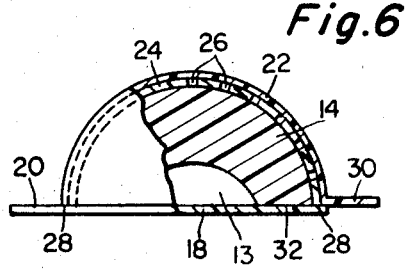

United States Patent Office 3,470,787
Patented Oct. 7, 1969

3,470,787
CORROSION PREVENTION DEVICE AND METHOD
William L. Mackie, Ventura, Calif., assignor to the United States of America as represented by the Secretary of the Army
Filed Mar. 27, 1968, Ser. No. 716,661
Int. Cl. F16b 15/02; B29c 1/04; B29d 3/00
U.S. Cl. 85—53      8 Claims

ABSTRACT OF THE DISCLOSURE

A protective cap having a sealant material therein which when applied to a fastener effectively excludes air and retards corrosion. In one embodiment it includes a corrosion indicator which will signal the start of any corrosion under the cap.

---

The invention described herein may be manufactured and used by or for the Government of the United States of America for governmental purposes without the payment of any royalties thereon or therefor.

BACKGROUND OF THE INVENTION

Field of the invention

The present invention relates in general to protective covering devices. More particularly the invention relates to means for preventing corrosion of fastening devices such as bolts or nuts.

Description of the prior art

Various means have been employed for reducing the susceptibility of fastening devices to the effects of corrosion. In the past most fasteners have been protected against corrosive deterioration by the application thereto of a thin coating of plastic or paint sealant materials. However, the primary limitation of these and other heretofore known corrosion preventatives is that they must be manually applied such as by hand, pressure gun, etc., which is time consuming, expensive and wasteful. Moreover it is quite difficult to apply a uniform protective coating of such sealants thus inviting destructive penetration by corrosive media.

SUMMARY OF THE INVENTION

The present invention involves a cap for covering a fastening device, said cap being filled with a sealing material such as polysulfide, or silicone rubbers, etc. The cap with the included sealants is applied over a protruding fastener which is effectively sealed and protected against the deleterious effects of corrosion. A corrosion indicator may be incorporated within the sealing material to show any possible corrosion on the fastening device under the cap.

It is therefore an object of the present invention to provide a device for covering exposed fasteners in order to retard corrosive deterioration thereof.

It is another object to provide a device for covering simultaneously a multiplicity of exposed fasteners.

Another object is to provide a protective fastener covering device which contains a sealing material therein.

Another object is to provide a transparent protective fastener covering device through which the start of corrosion may be detected and which may incorporate a water and/or corrosion indicator within the included sealant.

Still another object is to provide a protective fastener covering device which is simple, inexpensive, easily applied and removed and effective in operation.

Other objects, advantages, and novel features of the invention will become apparent from the following detailed description of the invention when considered in conjunction with the accompanying drawings.

BRIEF DESCRIPTION OF THE DRAWINGS

FIG. 1 is a perspective view of a transparent fastener cover installed over a bolt head.

FIG. 2 is an enlarged vertical sectional view taken along a line substantially corresponding to line 2—2 of FIG. 1.

FIG. 3 is a view similar to FIG. 2 showing the assembled fastener cap with removable protective undercovering as it appears before application to a fastener.

FIG. 4 is a perspective view similar to FIG. 1 of a modified fastener cap adapted for air curing.

FIG. 5 is an enlarged vertical sectional view of the cap of FIG. 4 installed in place, taken along a line substantially corresponding to line 5—5 of FIG. 4.

FIG. 6 is a view similar to FIG. 5 showing the assembled fastener cap with removable protective undercovering as it appears before application to a fastener.

FIG. 7 is a perspective view of a modification particularly adapted for application to a joint area or a row of fastening devices.

FIG. 8 is an enlarged cross-sectional view of the embodiment of FIG. 7 taken along a line substantially corresponding to line 8—8 of FIG. 7.

DESCRIPTION OF THE PREFERRED EMBODIMENT

Referring now to the drawings, there is shown a hollow substantially dome shaped cap 10 having a relatively thin outer wall 11 and a centrally located cavity 12, said cavity being substantially filled with a sealing material 14 such as polysulfide or silicone rubber (room temperature vulcanizing), or chromium paste compositions. A small unfilled space 13 may be left as illustrated.

A pressure sensitive plastic closure film 18 may be adhered to the bottom edge 17 of cap 10 which effectively closes off the bottom or open side 16 of said cap from the atmosphere. This maintains the sealing material 14 in a fresh uncured condition and available for utilization at any desired time. A pull tab 20 may be attached to the closure film 18, if so desired, to facilitate removal thereof prior to use.

The cap 10 may be fabricated from any suitable material which is non-soluble in water and has good resistance to climatic or industrial environments, such as polypropylene, vinyl or polyethylene compositions.

Thus, application of cap 10 merely involves the preliminary removal of plastic closure film 18 therefrom by using the pull tab 20 and then pressing the cap over an exposed fastener. In a reasonably short period of time, the sealing material will harden to a flexible mass sealing the cap over the fastener and thereby successfully retarding the advent of corrosion by preventing admission of moisture. The cap 10 being water insoluble remains permanently in position over the protruding fastener and is not removed for any reason except for inspection purposes.

If it is desired, the aforesaid cap 10 may be manufactured without the closure film 18 adhered to the bottom edge 17 thereof. In this modification the sealing material 14 is inserted in the cavity 12 of cap 10 just prior to pressing the cap over a fastener or such similar device.

In this and all other embodiments, the use of transparent materials in the fabrication of a non-water-soluble cap 10 is fully contemplated. Furthermore the sealing material 14 may itself be transparent. Examples of transparent cap materials include polyamide, polypropylene, fluorinated ethylene-propylene copolymer, and vinyl compositions to name only a few. Silicone compositions provide excellent protective sealants which are not only transparent but are also superior corrosion inhibiting materials. The utilization of both transparent caps 10 and transparent sealing materials 14 permit a visual inspection of the fasteners and adjacent joint surface without the destructive removal of the caps.

A further innovation of the invention includes the use of an indicator placed within the sealing material 14 which will change color during the presence of moisture. There are numerous indicators commercially available for the determination of moisture and one example thereof is silica gel impregnated with cobaltous chloride. This indicator may be mixed within the sealing material 14 and in the advent of moisture, the indicator would change from a blue to red color clearly visible through both the transparent sealant 14 and transparent cap 10. Since the advent of moisture may signal possible corrosion, the cap 10 is removed and the fastening device is cleaned. Thereafter a new protective cap with included sealant is reapplied over the fastener.

FIGURES 4, 5 and 6 illustrate a different embodiment of this invention in which cap 10 is provided with a closely adjacent outer shell 22 and an inner shell 24, said inner shell having a plurality of perforations 26 therein. A suitable sealant material 14 is also positioned within the inner perforated shell 24 and is maintained in a fresh usable condition by closing the open bottom side 32 of cap 10 with the pressure sensitive closure film 18, said film being adhered to the bottom edges 28 of outer shell 22. A standard pull tab 20 may be connected to closure film 18 for assisting in removal thereof at the time cap 10 is to be used. Both the outer shell 22 and inner shell 24 are fabricated from non-water-soluble plastic materials.

Application of this embodiment requires removal of the plastic closure film 18 after which the cap assembly is pressed over a fastener. Thereafter the outer shell 22 may be removed and the perforation 26 in the inner shell 24 permit air curing of the enclosed sealing material 14 and provide both an air and water tight seal around the fastener. A tab portion 30 may conveniently be connected to the bottom edge 28 of the outer shell 22 to aid in the removal thereof. As in the preferred embodiment, the closure film 18 may be omitted from this embodiment and the sealant material 14 added at the time of utilization.

FIGURES 7 and 8 illustrate a further embodiment of this invention in which cap 10 is semi-cylindrically shaped and elongated in design so that a multitude of fasteners or similar devices may be covered by just one cap. This particular embodiment is preferably similarly fabricated of water insoluble materials and may include the double wall feature as previously discussed if so desired. A sealant protected by a closure film may also be present or the sealant can be added at the time of use whichever is preferred. The intent is to provide a single cap structure which may cover a large number of fasteners.

Other geometrical shaped designs of the cap 10 may be employed if necessary, thus it may be hexagonal, square or otherwise conform to the exterior shape of the fastener being protected.

It will be apparent that the protective sealing device of this invention will find many diversified uses in addition to the prevention or retardation of natural corrosion on exposed fasteners. The caps 10, for example, may be successfully employed to seal fasteners used in harsh industrial environments, such as protective covers over submerged fasteners in a corrosive acid bath medium.

Other uses for the device may include suppression of hydrogen embrittlement, absorption of vibration of shock, and inhibition of galvanic corrosion.

Obviously many modifications and variations of the present invention are possible in the light of the above teachings. It is therefore to be understood that the invention may be practiced otherwise than as specifically described.

What is claimed is:

1. A protective cap for fastening devices comprising:
    a hollow imperforate dome shaped member open at the base thereof and adapted to fit over said fastening device;
    a sealant material substantially filling said hollow imperforate dome shaped member; and
    said hollow imperforate dome shaped member being adapted to maintain the sealant material therein as an intact part thereof.

2. The protective cap of claim 1 wherein closure means extend across the base of said dome shaped member for maintaining said sealant material included therein in fresh, usable condition and to retain the separate integrity of the protective caps during storage thereof.

3. The protective cap of claim 1 wherein said dome shaped member is fabricated from a transparent water insoluble substance and wherein said included sealant material is also transparent.

4. The protective cap of claim 3 wherein the transparent water insoluble material is selected from the group consisting of polypropylene, fluorinated ethylene-propylene copolymer, and vinyl compositions and said transparent sealant comprises a silicone composition.

5. The protective cap of claim 3 wherein a moisture indicator is included in the sealant material.

6. A protective cap for fastening devices comprising:
    a hollow dome shaped member open at the base thereof and adapted to cover an exposed fastening device, said dome shaped member having closely adjacent inner and outer shells, each being fabricated from transparent water insoluble material, with said inner shell having perforations therein;
    a transparent sealant material substantially filling said hollow dome shaped member with a moisture indicator therein; and
    closure means extending from said outer shell across the base of said dome shaped member for maintaining said sealant material in a usable condition.

7. A method of protecting an exposed fastening device comprising:
    fabricating a transparent hollow dome shaped member from water insoluble materials;
    filling said dome shaped member with a transparent sealant material having a moisture indicator therein;
    pressing said dome shaped member with included sealant material over said fastening device; and
    curing said sealant material within the dome shaped member to a tough flexible moisture proof mass,
    thus providing an air and moisture proof seal around the fastener.

8. A method of protecting an exposed fastening device comprising:
    fabricating a hollow transparent dome shaped member from water insoluble materials, said member having closely adjacent independent inner and outer shells, said inner shell being perforated;
    filling said dome shaped member with a transparent sealant material in which a moisture indicator has been included;
    removing said outer shell from the dome shaped member;
    pressing said perforated inner shell over the exposed fastener; and curing said sealant material within said perforated shell to a flexible moisture proof seal.

References Cited

UNITED STATES PATENTS

| | | |
|---|---|---|
| 2,688,497 | 9/1954 | Brisack. |
| 2,697,873 | 12/1954 | Cooke. |
| 2,710,113 | 6/1955 | Pritchard. |
| 2,927,495 | 3/1960 | Barwood. |
| 3,009,722 | 11/1961 | Augustin. |
| 3,218,906 | 11/1965 | Dupree. |

FOREIGN PATENTS 875,224  8/1961  Great Britain.

RAMON S. BRITTS, Primary Examiner

U.S. Cl. X.R.

85—1; 264—250, 271, 316; 277—2